US006521351B2

(12) United States Patent
Murschall et al.

(10) Patent No.: US 6,521,351 B2
(45) Date of Patent: Feb. 18, 2003

(54) OPAQUE, WHITE UV-RESISTANT FILM WITH LOW TRANSPARENCY MADE FROM A CRYSTALLIZABLE THERMOPLASTIC

(75) Inventors: Ursula Murschall, Nierstein (DE); Guenther Crass, Taunusstein (DE); Klaus Oberlaender, Wiesbaden (DE); Ulrich Kern, Ingelheim (DE)

(73) Assignee: Mitsubishi Polyester Film GmbH (DE)

( * ) Notice: Subject to any disclaimer, the term of this patent is extended or adjusted under 35 U.S.C. 154(b) by 0 days.

(21) Appl. No.: 09/779,154

(22) Filed: Feb. 8, 2001

(65) Prior Publication Data

US 2002/0115757 A1 Aug. 22, 2002

(30) Foreign Application Priority Data

Feb. 19, 2000 (DE) .......................... 100 07 673

(51) Int. Cl.[7] .......................... B32B 27/36; C08K 3/30; C08J 3/22
(52) U.S. Cl. ...................... 428/480; 523/351; 524/423; 428/332; 428/337
(58) Field of Search ................ 428/480, 332, 428/377; 524/423; 523/351

(56) References Cited

U.S. PATENT DOCUMENTS

| | | | |
|---|---|---|---|
| 4,780,402 A | | 10/1988 | Remmington |
| 4,898,897 A | * | 2/1990 | Kiyohara et al. |
| 4,921,670 A | | 5/1990 | Dallmann et al. |
| 5,061,610 A | * | 10/1991 | Carroll et al. |
| 5,149,734 A | * | 9/1992 | Fisher et al. |
| 5,281,379 A | * | 1/1994 | Noguchi et al. |
| 5,298,546 A | * | 3/1994 | Kirsch et al. |
| 5,409,974 A | * | 4/1995 | Sullivan et al. |
| 5,660,931 A | | 8/1997 | Kim et al. |
| 6,218,049 B1 | * | 4/2001 | Aylward et al. |

FOREIGN PATENT DOCUMENTS

| | | |
|---|---|---|
| EP | 0620 245 | 10/1994 |
| EP | 0 857 749 A1 | 8/1998 |

OTHER PUBLICATIONS

H.Day, D.M. Wiles: *J. Appl. Polym. Sci 16*, 1972 p. 203.
Kunststoff–Journal 8, No. 30–36 (1974).
Kunstoff–Journal 11, 26–31 (1974).

* cited by examiner

Primary Examiner—Peter Szekely
(74) Attorney, Agent, or Firm—ProPat, L.L.C.

(57) ABSTRACT

The present invention relates to an opaque, white UV-resistant low-flammability film with a thickness of from 10 to 500 μm whose principal constituent is a crystallizable thermoplastic. It also comprises at least barium sulfate, at least one UV stabilizer and at least one optical brightener. The barium sulfate and/or the optical brightener and/or the UV stabilizer here is either incorporated directly into the thermoplastic when the polymer is prepared or fed as a masterbatch during film production. The novel film is particularly suitable for interior decoration, for constructing exhibition stands, for exhibition requisites, for displays, for placards, for labels, for protective glazing of machines or of vehicles, in the lighting sector, in the fitting out of shops or of stores, as a promotional requisite or a laminating material, or in applications associated with food or drink, and also for outdoor applications, such as roofing systems, external cladding, protective coverings, applications in the construction sector, or illuminated advertising profiles, or in the transport sector.

17 Claims, No Drawings

OPAQUE, WHITE UV-RESISTANT FILM WITH LOW TRANSPARENCY MADE FROM A CRYSTALLIZABLE THERMOPLASTIC

The invention relates to an opaque, white UV-resistant film with low transparency made from a crystallizable thermoplastic and having a thickness of from 10 to 500 µm. The film comprises at least barium sulfate, at least one optical brightener, and also a UV stabilizer as light stabilizer, and has good orientability, low transparency, and also very good optical and mechanical properties. The invention further relates to a process for producing this film and to the use of the film.

BACKGROUND OF THE INVENTION

Opaque films with a thickness of from 10 to 500 µm are well known. None of the known films comprises either UV stabilizers as light stabilizer or optical brighteners, and neither the films nor items produced from them are therefore suitable for outdoor applications. In outdoor applications these films yellow, even after a short period, and their mechanical properties become impaired as a result of photooxidative degradation of the thermoplastic by sunlight.

EP-A-0 620 245 describes films with improved heat resistance. These films comprise antioxidants suitable for scavenging free radicals formed in the film and for degrading any peroxide formed. However, this specification makes no proposal as to how the UV resistance of films of this type may be improved.

DESCRIPTION OF THE INVENTION

The object of the present invention was to provide an opaque, white film with a thickness of from 10 to 500 µm which, besides having good orientability, good mechanical properties and good optical properties and a low Yellowness Index, above all has high UV resistance and offers a high level of protection from light.

For the purposes of the present invention, high UV resistance means that the films suffer no damage or extremely little damage when exposed to sunlight or other UV radiation, and therefore that the films are suitable for outdoor applications and/or critical indoor applications. In particular, when the films are used outdoors for a number of years they should in particular not yellow, nor become brittle and not have surface-cracking, and also have unimpaired mechanical properties. High UV resistance therefore implies that the film absorbs the UV light and does not transmit light until the visible region has been reached. The good optical properties include uniform, streak-free coloration over the entire length and width of the film, low luminous transmittance/transparency ($\leq 0\%$), acceptable surface gloss ($\geq 10$), and also a low Yellowness Index (dependent on thickness, $\leq 45$ for 250 µm films and $\leq 20$ for 50 µm films).

The good mechanical properties include a high modulus of elasticity (EMD $\leq 3300$ N/mm2; ETD $\geq 4200$ N/mm2), and also good tear strengths (in MD $\geq 120$ N/mm2; in TD $\geq 170$ N/mm2) and good longitudinal and transverse elongations at break (in MD $\geq 120\%$; in TD $\geq 50\%$).

Good orientability includes excellent capabilities of the film for orientation during its production, both longitudinally and transversely, without break-offs.

The novel film should moreover be recyclable, that is to say that any cut material arising during continuous film production can be fed back into the production operation as regrind, in particular without loss of optical or mechanical properties from the film, so that it can still be used for interior applications and in constructing exhibition stands, for example.

This object is achieved by an opaque white film with a thickness of from 10 to 500 µm whose principal constituent is a crystallizable thermoplastic, wherein the film comprises at least barium sulfate as pigment, at least one UV stabilizer as light stabilizer and at least one optical brightener.

The novel film comprises, as principal constituent, a crystallizable thermoplastic. Examples of suitable crystallizable or semicrystalline thermoplastics are polyethylene terephthalate, polybutylene terephthalate and polyethylene naphthalate, and preference is given to polyethylene terephthalate.

For the purposes of the present invention, a crystallizable thermoplastic is a crystallizable homopolymer;

a crystallizable copolymer;

a crystallizable compound;

a crystallizable recycled material, or another type of crystallizable thermoplastic.

The novel film may have one layer, or else two or more layers, and it may have been coated with various copolyesters or with adhesion promoters.

The novel film comprises at least one UV stabilizer as light stabilizer, and this is appropriately fed by way of what is known as masterbatch technology directly during film production, and the amount of UV stabilizer here is preferably from 0.01 to 5% by weight, based on the weight of the crystallizable thermoplastic.

The novel film comprises at least barium sulfate as pigment, and the amount of pigment here is preferably from 0.2 to 40% by weight, based on the weight of the crystallizable thermoplastic. The barium sulfate is preferably fed to the thermoplastic by way of what is known as masterbatch technology during film production.

The film comprises at least one optical brightener, and the amount of the optical brightener used here is from 10 to 50,000 ppm, in particular from 20 to 30,000 ppm, particularly preferably from 50 to 25,000 ppm, based on the weight of the crystallizable thermoplastic. It is preferable for the optical brightener, too, to be fed to the thermoplastic by way of what is known as masterbatch technology during film production.

Light, in particular the ultraviolet content of solar radiation, i.e. the wavelength region from 280 to 400 nm, induces degradation in thermoplastics, as a result of which their appearance changes due to color change or yellowing, and there is an adverse effect on mechanical/physical properties.

Inhibition of this photooxidative degradation is of considerable industrial and economic importance, since otherwise there are drastic limitations on the applications of many thermoplastics.

The absorption of UV light by polyethylene terephthalates, for example, starts at below 360 nm, increases markedly below 320 nm and is very pronounced at below 300 nm. Maximum absorption occurs at between 280 and 300 nm.

In the presence of oxygen it is mainly chain cleavage which occurs, but there is no crosslinking. The predominant photooxidation products in quantity terms are carbon monoxide, carbon dioxide and carboxylic acids. Besides the direct photolysis of the ester groups, consideration has to be given to oxidation reactions which likewise form carbon dioxide, via peroxide radicals.

In the photooxidation of polyethylene terephthalate there can also be cleavage of hydrogen at the position alpha to the ester groups, giving hydroperoxides and decomposition products of these, and this may be accompanied by chain cleavage (H. Day, D. M. Wiles: J. Appl. Polym. Sci 16, 1972, p. 203).

UV stabilizers, i.e. light stabilizers which are UV absorbers, are chemical compounds which can intervene in the physical and chemical processes of light-induced degradation. Carbon black and other pigments can give some protection from light. However, these substances are unsuitable for opaque white films, since they cause discoloration or color change. The only compounds suitable for opaque white films are those organic or organometallic compounds which produce no, or only extremely slight, color or color change in the thermoplastic to be stabilized. UV stabilizers suitable as light stabilizers are those which absorb at least 70%, preferably at least 80%, particularly preferably at least 90%, of the UV light in the wavelength region from 180 to 380 nm, preferably from 280 to 350 nm. These are particularly suitable if they are thermally stable in the temperature range from 260 to 300° C., that is to say they do not decompose into cleavage products and do not cause release of gases. Examples of UV stabilizers suitable as light stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, and sterically hindered amines and triazines, and among these preference is given to 2-hydroxybenzotriazoles and triazines.

Another additive present in the novel film is an optical brightener. The optical brighteners according to the invention are capable of absorbing UV radiation in the region from 360 to 380 nm and of re-emitting this as longer-wavelength, visible blue-violet light.

Suitable optical brighteners according to the invention are benzoxazoles, phenylcoumarins, and bis sterylbiphenyls, in particular phenylcoumarins, and particularly preferably triazine phenylcoumarins, which are obtainable as the product Tinolpal™ from Ciba-Geigy, Basle, Switzerland, or else Hostalux KS™ (Clariant, Germany), or else Estobrite OB1™ (Eastman).

Besides the optical brightener, blue dyes soluble in polyester may also be added if this is useful. Dyes which have proven successful are cobalt blue, ultramarine blue and anthraquinone dyes, in particular Sudan Blue 2 (BASF, Ludwigshafen, Germany).

The amounts of the blue dyes used are from 10 to 10,000 ppm, in particular from 20 to 5000 ppm, particularly preferably from 50 to 1000 ppm, based on the weight of the crystallizable thermoplastic.

It was highly surprising that the use of the abovementioned combination of additives made from barium sulfate, from UV stabilizer, from optical brightener and, if appropriate, from blue dyes gave the desired result in the films. The skilled worker would probably have begun by attempting to achieve some degree of UV resistance using an antioxidant, but would have found that the film rapidly yellows on weathering.

In the knowledge that UV stabilizers absorb UV light and therefore provide protection, the skilled worker would be likely to have used commercially available UV stabilizers. It would then have been observed that the UV stabilizer has unsatisfactory thermal stability and at temperatures of from 200 to 240° C. decomposes or releases gases, and large amounts (from about 10 to 15% by weight) of the UV stabilizer have to be incorporated so that the UV light is adequately absorbed and the film therefore not damaged.

At these high concentrations it would have been observed that the film is yellow straightaway after it has been produced, with Yellowness Index deviations (YID) around 25. It would also have been observed that the mechanical properties of the film are adversely affected. Orientation would have produced exceptional problems, such as break-offs due to unsatisfactory strength, i.e. modulus of elasticity die deposits, causing profile variations roller deposits from the UV stabilizer, causing impairment of optical properties (poor haze, defective adhesion, nonuniform surface), and deposits in stretching frames or heat-setting frames, dropping onto the film.

It was therefore more than surprising that even low concentrations of the combination according to the invention achieves excellent UV protection. It was very surprising that, together with this excellent UV protection, and due to the synergistic action of the additives the Yellowness Index of the film is not higher than that of an unstabilized film but lower, that is to say the film is whiter, there are no releases of gases, no die deposits and no frame condensation, and the film therefore has excellent optical properties and excellent profile and layflat, and the UV-resistant film has excellent stretchability, and can therefore be produced in a reliable and stable manner on high-speed film lines at speeds of up to 420 m/min.

The novel opaque white film is therefore also cost-effective.

It is also very surprising that the cut film material can also be reused as regrind for production of the film without any adverse effect on the Yellowness Index of the film.

A preferred embodiment uses precipitated grades of barium sulfate. Precipitated barium sulfate is obtained as a fine-particle colorless powder from barium salts and sulfates or sulfuric acid, and the particle size of the powder can be controlled via the conditions of precipitation. Precipitated barium sulfates may be prepared by the usual processes, which are described in Kunststoff-Journal 8, No. 10, 30–36 and No. 11, 36–31 (1974).

The amount of barium sulfate is appropriately from 0.2 to 40% by weight, preferably from 0.5 to 30% by weight, particularly preferably from 1 to 25% by weight, based on the weight of the thermoplastic.

The average particle size of the barium sulfate is relatively small and is preferably from 0.1 to 5 $\mu$m, particularly preferably from 0.2 to 3 $\mu$m (Sedigraph method). The density of the barium sulfate used is from 4 to 5 g/cm3.

In one particularly preferred embodiment, the novel film comprises, as principal constituent, a crystallizable polyethylene terephthalate, and also from 1 to 25% by weight of precipitated barium sulfate, appropriately with a particle diameter of from 0.4 to 1 $\mu$m, particularly preferably Blanc™ fixe XR-HX or Blanc Fixe HXH from Sachtleben Chemie.

The novel film also preferably comprises from 10 to 50,000 ppm of an optical brightener soluble in the crystallizable thermoplastic, particularly preferably the triazine phenylcoumarin obtainable as Tinopal (Ciba-Geigy, Basle, Switzerland), or Hostalux KS (Clariant GmbH), or else Eastobrite OB-1 (Eastman).

In its particularly preferred embodiment, the novel film also comprises from 0.01 to 5.0% by weight of 2-(4,6-diphenyl-1,3,5-triazin-2-yl)-5-hexyloxyphenol of the formula:

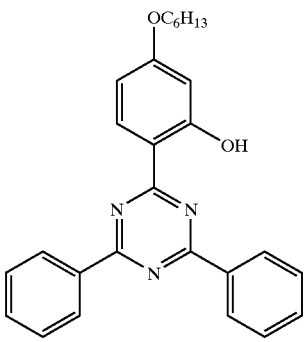

or from 0.1 to 5.0% by weight of 2,2'-methylenebis(6-(2H-benzotriazol-2-yl)-4-(1,1,2,2-tetramethylpropyl)phenol of the formula:

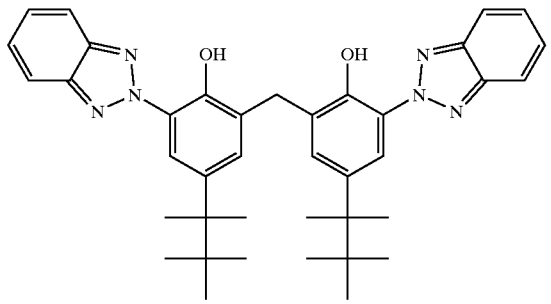

in each case based on the weight of the thermoplastic.

In another embodiment it is also possible for mixtures of the UV stabilizers mentioned or mixtures of at least one of the preferred UV stabilizers with other UV stabilizers to be used, where the total amount of light stabilizer is preferably from 0.01 to 5.0% by weight, based on the weight of the thermoplastic.

The surface gloss of the novel opaque white film, measured to DIN 67530 (measurement angle 20°) is greater than or equal to 10, preferably greater than or equal to 15.

The luminous transmittance (transparency) of the novel opaque white film, measured to ASTM-D 1003, is less than or equal to 30%, preferably less than or equal to 25%. The coloration is uniform and streak-free over the entire running length and width of the film.

As a result of the synergistic action of the additives barium sulfate, UV stabilizer, optical brightener and, if present, blue dye, the novel opaque white film is whiter, that is to say has less yellow tinge, than a film provided only with barium sulfate.

The longitudinal modulus of elasticity (ISO 527-1-2) of the novel opaque white film is greater than or equal to 3300 N/mm2, preferably greater than or equal to 3600 N/mm2. Its transverse modulus of elasticity (ISO 527-1-2) is greater than or equal to 4800 N/mm2, preferably greater than or equal to 5100 N/mm2.

The standard viscosity SV (DCA) of the polyethylene terephthalate, measured in dichloroacetic acid to DIN 53728, is from 600 to 1100, preferably from 700 to 1000.

The intrinsic viscosity IV (DCA) is calculated from the standard viscosity SV (DCA) as follows:

$$IV(DCA)=6.67 \cdot 10-4SV(DCA)+0.118$$

The opaque white polyethylene terephthalate film which comprises at least barium sulfate, one optical brightener, one UV stabilizer and, if desired, blue dyes may have either one layer or else two or more layers.

In the embodiment having two or more layers, the film has a structure of at least one core layer and at least one outer layer, and particular preference is given here to a three-layer structure of type A-B-A or A-B-C.

A substantive factor for the embodiment having two or more layers is that the polyethylene terephthalate of the core layer has a standard viscosity similar to that of the polyethylene terephthalate of the outer layer(s) which is/are adjacent to the core layer.

In one particular embodiment, the outer layers may also be composed of a polyethylene naphthalate homopolymer or of a polyethylene terephthalate-polyethylene naphthalate copolymer, or of a compound. In this particular embodiment, the thermoplastics of the outer layers likewise have a standard viscosity similar to that of the polyethylene terephthalate of the core layer.

In the embodiment having two or more layers, the barium sulfate, and also the optical brightener and, if present, the blue dye are preferably present in the core layer. However, modification of the outer layers is also possible, if required.

In the embodiment having two or more layers, however, the UV stabilizer is preferably present in the outer layer(s). However, provision of UV stabilizers in the core layer is also possible, if required.

In the embodiment having two or more layers, unlike in the single-layer embodiment, the amounts given for the additives are based on the weight of the thermoplastics in the layer provided with the additive(s).

There may also be provision of a scratch-resistant coating, a copolyester or an adhesion promoter on one or more sides of the film.

Very surprisingly, weathering tests to the test specification of ISO 4892 using the Atlas Ci 65 Weather-Ometer showed that in the case of a three-layer film provision of UV stabilizers in the outer layers of from 0.5 to 2 μm thickness is entirely sufficient.

The UV-resistant films having two or more layers and produced by known coextrusion technology are therefore of interest in economic terms when compared with fully UV-resistant monofilms, since markedly less UV stabilizer is needed to achieve comparable UV stability.

Weathering tests have shown that, even after from 5 to 7 years in an outdoor application (extrapolated from the weathering tests) the novel UV-resistant films generally show no increase in yellowing, no embrittlement, no loss of surface gloss, no surface cracking and no impairment of mechanical properties.

During production of the film it was found that the UV-resistant film has excellent capability for being oriented longitudinally and transversely, without break-offs. In addition, no evolution of gas of any type was found from the UV stabilizer during the production process, and this is a substantive factor for the invention, since most UV stabilizers evolve undesirable and unpleasant gases at extrusion temperatures above 260° C., and are therefore of no use.

In addition, the novel film is easy to recycle without pollution of the environment and without loss of mechanical properties, making it suitable, for example, for use as short-lived promotional placards, labels or other promotional requisites.

An example of a production process for producing the novel film is extrusion on an extrusion line.

According to the invention, the barium sulfate, the UV stabilizer, the optical brightener and, if present, the blue dye may be incorporated directly when the thermoplastic polymer is prepared, or fed into the extruder by way of masterbatch technology during film production. It is preferable for the barium sulfate, the UV stabilizer, the optical brightener and, if present, the blue dye to be fed by way of masterbatch technology. The additives here are fully dispersed in a solid carrier material. Carrier materials which may be used are the thermoplastic itself, e.g. the polyethylene terephthalate, or else other polymers sufficiently compatible with the thermoplastic.

It is important that the particle size and the bulk density of the masterbatch(es) are similar to the particle size and the bulk density of the thermoplastic, so that uniform dispersion is achieved, and with this uniform UV stabilization and uniform opacity.

The polyester films may be produced by known processes from a polyester with, if desired, other polymers, and also with the optical brightener, the UV stabilizer, the barium sulfate, if desired with the blue dye, and/or with a usual amount of from 0.1 to a maximum of 10% by weight of other customary additives, either in the form of monofilms or else in the form of, if desired, coextruded films having two or more layers and with identical or differently constructed surfaces, where one surface may have provision of pigment and UV stabilizer, and no pigment and/or UV stabilizer is present in the other surface. Known processes may also have been used to provide one or both surfaces of the film with a conventional functional coating.

In the preferred extrusion process for producing the polyester film, the molten polyester material is extruded through a slot die and quenched on a chill roll, as a substantially amorphous prefilm. This film is then reheated and stretched longitudinally and transversely, or transversely and longitudinally, or longitudinally, transversely and again longitudinally and/or transversely. According to the invention, the stretching temperatures are from Tg+10 K to Tg+60 K (where Tg is the glass. transition temperature), the longitudinal stretching ratio according to the invention is from 2 to 6, in particular from 2.5 to 4.5, and the transverse stretching ratio is from 2 to 5, in particular from 3 to 4.5, and the ratio for any second longitudinal stretching carried out is from 1.1 to 3. The first longitudinal stretching may, if desired, be carried out simultaneously with the transverse stretching (simultaneous stretching). This is followed by the heat-setting of the film at oven temperatures of from 200 to 260° C., in particular from 220 to 250° C. The film is then cooled and wound up.

An entirely unexpected finding was that the process parameters for the longitudinal stretching are a variable which significantly affects the optical properties (transparency) of the film. The process parameters for the longitudinal stretching include in particular the longitudinal stretching ratio and the longitudinal stretching temperature. It was highly surprising that the transparency could be markedly affected by varying the longitudinal stretching ratio. If, for example, a film plant produces a film whose transparency is above the values according to the invention, novel films with a lower transparency can be produced by increasing the longitudinal stretching ratio during the longitudinal stretching procedure. A relative increase of 7% in the longitudinal stretching ratio gave a relative reduction of from 15 to 20% in transparency.

The surprising combination of excellent properties makes the novel film highly suitable for a variety of different applications, such as interior decoration, for constructing exhibition stands, for exhibition requisites, for displays, for placards, for labels, for protective glazing of machines or of vehicles, in the lighting sector, in the fitting out of shops or of stores, as a promotional requisite or a laminating material, or in applications associated with food or drink.

A good UV resistance of the novel film also makes it suitable for outdoor applications, e.g. for roofing systems, external cladding, protective coverings, applications in the construction sector, or illuminated advertising profiles, or in the transport sector.

The examples below illustrate the invention in more detail.

The following standards and methods are used here when testing individual properties.

Test Methods

Surface Gloss

Surface gloss is measured with a measurement angle of 20° to DIN 67530.

Luminous Transmittance/transparency

For the purposes of the present invention, the luminous transmittance/transparency is the ratio of total light transmitted to the amount of incident light. Luminous transmittance is measured using "Hazegard plus" test equipment to ASTM D 1003.

Surface Defects and Uniform Coloration

Surface defects and uniform coloration are determined visually.

Mechanical Properties

The modulus of elasticity, tear strength and elongation at break are measured longitudinally and transversely to ISO 527-1-2.

SV (DCA) and IV (DCA)

The standard viscosity SV (DCA) is measured by a method based on DIN 53726 in dichloroacetic acid.

The intrinsic viscosity (IV) is calculated as follows from the standard viscosity (SV)

$$IV(DCA)=6.67\cdot10-4SV(DCA)+0.118$$

Yellowness Index

The Yellowness Index YID is the deviation from the colorless condition in the "yellow" direction and is measured to DIN 6167.

Weathering (on Both Sides) and UV Resistance

UV resistance is tested as follows to the test specification of ISO 4892

Test equipment: Atlas Ci 65 Weather-Ometer

Test conditions: ISO 4892, i.e. artificial weathering

Irradiation time: 1000 hours (per side)

Irradiation: 0.5 W/m2, 340 nm

Temperature: 63° C.

Relative humidity: 50%

Xenon lamp: Internal and external filter made from borosilicate

Irradiation cycles: 102 minutes of UV light, then 18 minutes of UV light with water spray onto the specimens, then another 102 minutes of UV light, etc.

In the examples and comparative examples below, each of the films is a single-layer opaque white film, produced on the extrusion line described.

Each of the films was weathered to the test specification of ISO 4892 for 1000 hours per side, using an Atlas Ci 65 Weather-Ometer, and then tested for mechanical properties, discoloration, surface defects, luminous transmittance and gloss.

EXAMPLE 1

An opaque white film of 50 µm thickness was produced and comprised the clear polymer polyethylene terephthalate (RT49, KoSa, Germany) as principal constituent, 18% by weight of barium sulfate (Blanc fixe XR-HX, Sachtleben Chemie) as pigment, 0.5% of UV stabilizer (Tinuvin 1577, Ciba-Geigy, Basle) as light stabilizer, 200 ppm of optical brightener (Tinopal, Ciba-Geigy, Basle) and 40 ppm of blue dye (Sudan Blue 2, BASF, Ludwigshafen).

The additives barium sulfate, UV stabilizer, optical brightener and blue dye were added as masterbatches.

Masterbatch (1) was composed of 64% by weight of the clear polymer and 36% by weight of barium sulfate. Masterbatch (2) was composed of 20% by weight of UV stabilizer, and 80% by weight of clear polymer. Masterbatch (3) comprised, in addition to clear polymer, 8000 ppm of optical brightener and 2000 ppm of blue dye.

Prior to extrusion, 50% by weight of masterbatch (1), 2.5% by weight of masterbatch (2), 2.5% by weight of masterbatch (3) and 45% by weight of clear polymer were dried at a temperature of 150° C. and then melted in the extruder.

The longitudinal stretching ratio established during production of the film was precisely 3.1.

EXAMPLE 2

Example 1 was repeated, except that the longitudinal stretching ratio was reduced to 2.9.

EXAMPLE 3

The mixing specification corresponded to that of Example 1, but the longitudinal stretching ratio was increased to 3.3, while the longitudinal stretching temperatures remained unchanged.

Comparative Example 1

Example 2 was repeated, except that no masterbatch (3) was added to the film.

Comparative Example 2

Comparative Example 1 was repeated, except that neither masterbatch (2) nor masterbatch (3) was added to the film, and the only additive present in the film was therefore the pigment barium sulfate.

The opaque white PET films produced in Examples 1 to 3 and the films of Comparative Examples 1 and 2 had the property profiles illustrated in the table below:

TABLE

| Properties | Ex. 1 | Ex. 2 | Ex. 3 | Comp. Ex. 1 | Comp. Ex. 2 |
| --- | --- | --- | --- | --- | --- |
| Thickness [μm] | 50 | 50 | 50 | 50 | 50 |
| Surface gloss side 1 | 20 | 19 | 20 | 20 | 19 |
| (Measurement angle 20°) side 2 | 21 | 20 | 21 | 21 | 20 |
| Luminous transmittance/ transparency [%] | 19.3 | 22.7 | 16.4 | 22.8 | 22.6 |
| Yellowness Index (YID) | 18 | 18 | 18 | 24 | 25 |
| Longitudinal modulus of elasticity [N/mm2] | 3600 | 3650 | 3600 | 3550 | 3650 |
| Transverse modulus of elasticity [N/mm2] | 5200 | 5200 | 5150 | 5100 | 5200 |
| Longitudinal tear strength [N/mm2] | 150 | 155 | 155 | 160 | 150 |
| Transverse tear strength [N/mm2] | 240 | 240 | 230 | 230 | 240 |
| Longitudinal elongation at break [%] | 180 | 190 | 185 | 185 | 185 |
| Transverse elongation at break [%] | 65 | 65 | 60 | 65 | 65 |
| Coloration | brilliant white | brilliant white | brilliant white | tinged yellow | tinged yellow |

Results of Weathering Tests

After 1000 hours of weathering per side on the Atlas Ci 65 Weather-Ometer, the appearance of the films of Examples 1 to 3 and of Comparative Example 1 hardly differed from that of unweathered films. There was almost no change in mechanical properties when comparison was made with unweathered films. After 1000 hours of weathering per side on the Atlas Ci 65 Weather-Ometer the film of Comparative Example 2 had surface cracks and showed embrittlement. It was therefore no longer possible to measure its property profile precisely. The film also had visibly more yellow coloration.

What is claimed is:

1. An opaque white film having excellent weathering and yellowing resistance with a thickness of from 10 to 500 μm, whose principal constituent is a polyethylene terephthalate, wherein the film comprises at least one pigment that is barium sulfate, at least one UV stabilizer, at least one optical brightener and a blue dye;
   wherein the film has a yellowness index of less than or equal to 20 from a 50 μm thickness.

2. The opaque white film as claimed in claim 1, wherein the crystallizable thermoplastic has been selected from the group consisting of polyethylene terephthalate, polybutylene terephthalate and polyethylene naphthalate.

3. The opaque white film as claimed in claim 1, wherein from 0.2 to 40% by weight of barium sulfate as pigment, based on the weight of the crystallizable thermoplastic, is present in the film and the barium sulfate is fed to the thermoplastic by way of masterbatch technology during film production.

4. The opaque white film as claimed in claim 1, wherein from 10 to 50,000 ppm, of optical brightener, based on the weight of the crystallizable thermoplastic, is present in the film and the optical brightener is fed to the thermoplastic by way of masterbatch technology during film production.

5. The opaque white film as claimed in claim 1 or 4, wherein the optical brightener has been selected from the group consisting of bisbenzoxazoles, phenylcoumarins and bisstearylbiphenyls.

6. The opaque white film as claimed in claim 1, wherein from 0.01 to 5% by weight, based on the weight of the thermoplastic, of UV stabilizer is present as light stabilizer in the film, and the UV stabilizer has been selected from the group consisting of 2-hydroxybenzophenones, 2-hydroxybenzotriazoles, organonickel compounds, salicylic esters, cinnamic ester derivatives, resorcinol monobenzoates, oxanilides, hydroxybenzoic esters, sterically hindered amines and triazines and mixtures of these, and the UV stabilizer is fed to the thermoplastic by way of masterbatch Technology during film production.

7. The opaque white film as claimed in claim 1, wherein the blue dye is a polyester-soluble blue dye selected from the group consisting of cobalt blue, ultramarine blue, anthraquinone dyes and mixtures of these, and the amount of blue dye is form 10 to 10,000 ppm, based on the weight of the polyethylene terephthalate.

8. The opaque white film as claimed in claim 1, wherein the barium sulphate is present as precipitated barium sulfate in the film and is in the form of fine-particle colorless powder with an average grain size of from 0.1 to 5 μm, measured by the Sedigraph method.

9. The opaque white film as claimed in claim 1, wherein the surface gloss of the film measured to DIN 67530 (measurement angle 20°) is greater than or equal to 10, and the luminous transmittance (transparency) of the film, measured to ASTM-D 1003 is less than or equal to 30%.

10. The opaque white film as claimed in claim 1, wherein the film has a core layer and at least one outer layer.

11. The opaque white film as claimed in claim 10, wherein, the barium sulfate, the UV stabilizer and the optical brightener are present in the core layer.

12. The opaque white film as claimed in claim 10 or 11, wherein the outer layers, too, have been provided with barium sulfate, UV stabilizer, and optical brightener.

13. The opaque white film as claimed in claim 7, wherein the film has a core layer and at least one outer layer, wherein the barium sulfate, the UV stabilizer, the optical brightener and blue dye are present in the core layer.

14. The opaque white film as claimed in claim 7, wherein the film has one or more layers, and the embodiment having more than one layer comprises at least one core layer and at least one outer layer, wherein the outer layers, too, have been provided with barium sulfate, UV stabilizer, and optical brightener.

15. The opaque white film as claimed in claim 1, wherein a scratch-resistant coating, a copolyester or an adhesion promoter has been provided on at least one side of the film.

16. A process for producing an opaque white film having excellent weathering and yellowing resistance, wherein the film has a yellowness index of less than or equal 20 for a 50 μm thickness, said process comprising:

melting, mixing and compacting thermoplastic material, barium sulfate, at least one UV stabilizer, at least one optical brightener, and a blue dye, therein forming a uniform mixture in an extruder;

extruding the uniform mixture through a slot die;

quenching on a chill roll forming a substantially amorphous prefilm;

reheating and stretching the prefilm longitudinally and transversely, or transversely and longitudinally, or longitudinally, transversely and again longitudinally and/or transversely, where said stretching establishes the stretching temperatures at from 100 °C. to Tg+60 K and establishes a longitudinal stretching ratio of from 2 to 5, and a transverse stretching ratio of from 2 to 5; and then heat-setting the film at 220 to 260 C.

17. The process as claimed in claim 16, wherein the heat-set of the film is carried out at temperatures of from 220 to 250° C.

* * * * *